United States Patent

[11] 3,603,825

[72] Inventors John J. Sheridan
　　　　　　　 Middletown;
　　　　　　　 Gene D. Bricker, Wilkinson; Donald F.
　　　　　　　 Wigner, Anderson, all of, Ind.
[21] Appl. No. 39,237
[22] Filed May 21, 1970
[45] Patented Sept. 7, 1971
[73] Assignee General Motors Corporation
　　　　　　　 Detroit, Mich.

[54] WINDING SPOOL AND LEAD SUPPORT INSULATOR FOR ROTORS OF ALTERNATING CURRENT GENERATORS
3 Claims, 5 Drawing Figs.

[52] U.S. Cl.................................................. 310/194,
　　　　　　　　　　　　　　　　　　　　　　　　　 310/234
[51] Int. Cl..................................................... H02k 3/00
[50] Field of Search.......................................... 310/194,
　　　　　　　　　　　　　　　　　　 263, 237, 40 MM, 233, 234

[56] References Cited
UNITED STATES PATENTS
　696,080　3/1902　Reist............................. 310/194

1,752,866　4/1930　Trombetta..................... 310/194 X
3,271,604　9/1966　Priddy........................... 310/234

Primary Examiner—D. X. Sliney
Attorneys—E. W. Christen, A. F. Duke and C. R. Meland ABSTRACT: A spool for carrying a field winding and an insulator for carrying leads connected to the ends of the winding are located on opposite sides of an intervening rotor segment. Barrellike projections on the insulator extend through openings defined by the spaces between the pole tips of the rotor segment and engage apertures in ears extending radially from a circular flange on the spool. The leading end of the field winding is guided out to a terminal on the insulator from a central region on the spool through an undercut protective groove on the inside of the flange and then through the aperture and bore in a mating set of ears and projections. The terminating end of the field winding is guided out to another terminal on the insulator through apertures in another mating set of ears and projections. The ends of the field windings are terminated with leads held by the insulator and connected with slip rings.

PATENTED SEP 7 1971

INVENTORS
John J. Sheridan,
BY Gene D. Bricker &
Donald F. Wigner
Albert F. Duke
ATTORNEY PATENTED SEP 7 1971
3,603,825
SHEET 2 OF 2
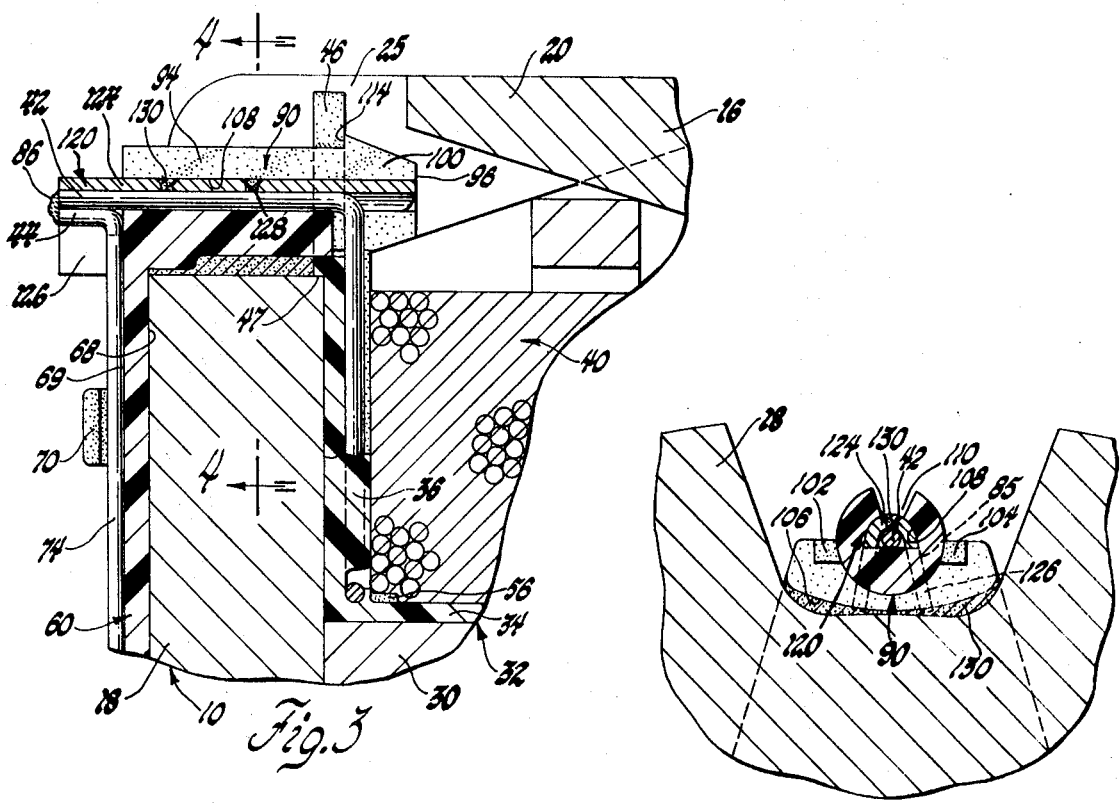
Fig.3
Fig.4
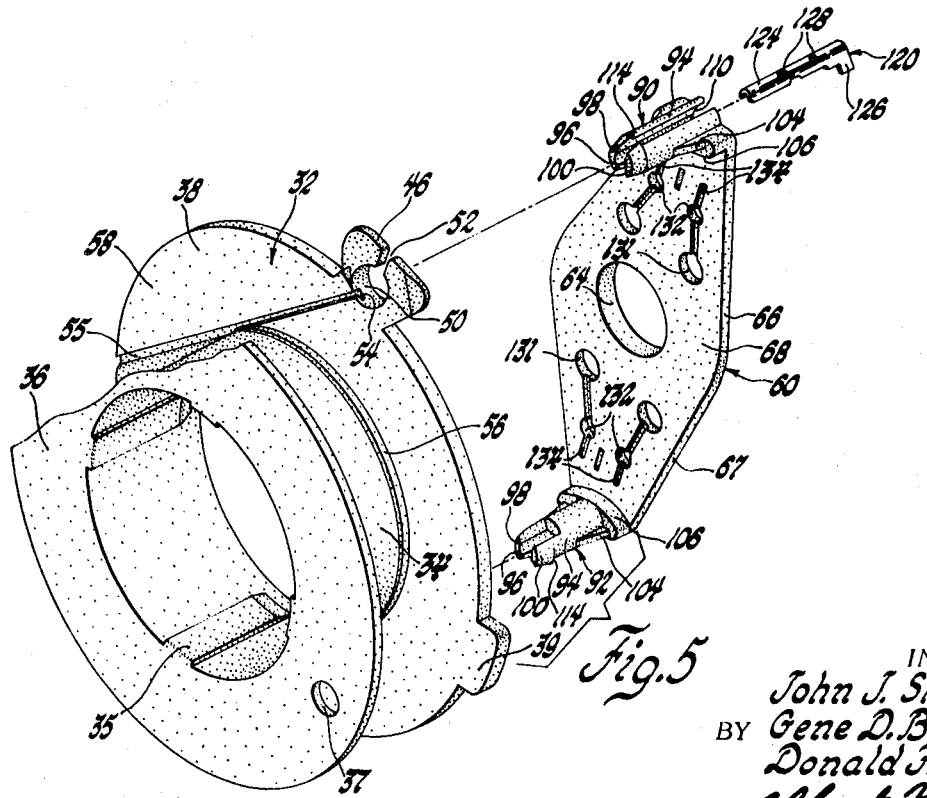
Fig.5
INVENTORS
John J. Sheridan,
BY Gene D. Bricker &
Donald F. Wigner
Albert F. Duke
ATTORNEY

WINDING SPOOL AND LEAD SUPPORT INSULATOR FOR ROTORS OF ALTERNATING CURRENT GENERATORS

This invention relates to a rotor having a spool and insulator engageable therewith whereby the ends of a field coil wound on the spool may be terminated on the insulator with leads from slip rings.

A field coil of an alternator for a vehicular charging system is located within a cavity generally defined by two rotor segments having interlacing pole tips. The ends of this coil must be connected to slip rings located outside the cavity concentrically with the rotor segments and coil. Such connections have heretofore been effected through orifices in the rotor segment or by bringing the coil ends out in a space between adjacent pole tips and then down the outside of the rotor segment to the slip rings.

The former approach require the forming of a separate hole and the insertion of a separate insulator therein for each coil end and prevented practical preassembly of the insulators and slip rings. The latter approach exposed the conductors to the centrifugal and windage effects along the path between the coil and slip rings thereby introducing unnecessary risks of fatigue and failure. With this latter approach, moreover, terminations of the coil ends to the slip rings were encumbered by having to first position each length of coil end adjacent the associated slip ring and then connecting the end and slip ring usually at a radius sufficiently small to prevent welding apparatus from terminating both coil ends at the same time.

It is, therefore, a primary object of the present invention to provide two structures, the first being a flat insulator having projections for receiving conductors and the second being a spool for receiving the coil and having aperture means to engage the projections, where the two structures both support the conductors connecting the coil and slip rings and also insulate these conductors from the adjacent metal rotor segment at all points along the paths between the coil and slip rings.

It is another object to provide structures of the foregoing types wherein the projections on the insulator are engaged by the apertures in the spool through openings through adjacent pole tips on a rotor segment and wherein with the coil ends supported within the projections and the leads from the slip rings may be terminated on the flat insulator in the region of the projections.

It is a further and more limited object of the present invention to provide structures of the foregoing type wherein the slip rings and leads therefrom may be preassembled with the insulator and wherein the apertures in the spool are located in the ears extending radially outwards from the flanges of the spool and axially into the openings between pole tips, thereby affording positive circumferential positioning of both the insulator and spool with respect to the rotor segment across which the leads from the slip ring and the ends of the coil are connected.

These and other objects of the present invention will be apparent from the following description reference being had to the accompanying drawings clearly showing preferred embodiments of the present invention, wherein:

FIG. 3 is a cross-sectional view of a portion of the rotor showing in enlarged scale the barrel projections from the insulator in engagement with the ears of the spool and a coil end secured in the barrel by a terminal and joined to a lead at the end of the terminal;

FIG. 4 also of enlarged scale is an end view of the insulator taken in cross section through the rotor elements; and FIG. 5 shows the spool and insulator of the present invention in exploded assembly.

Figure 1:
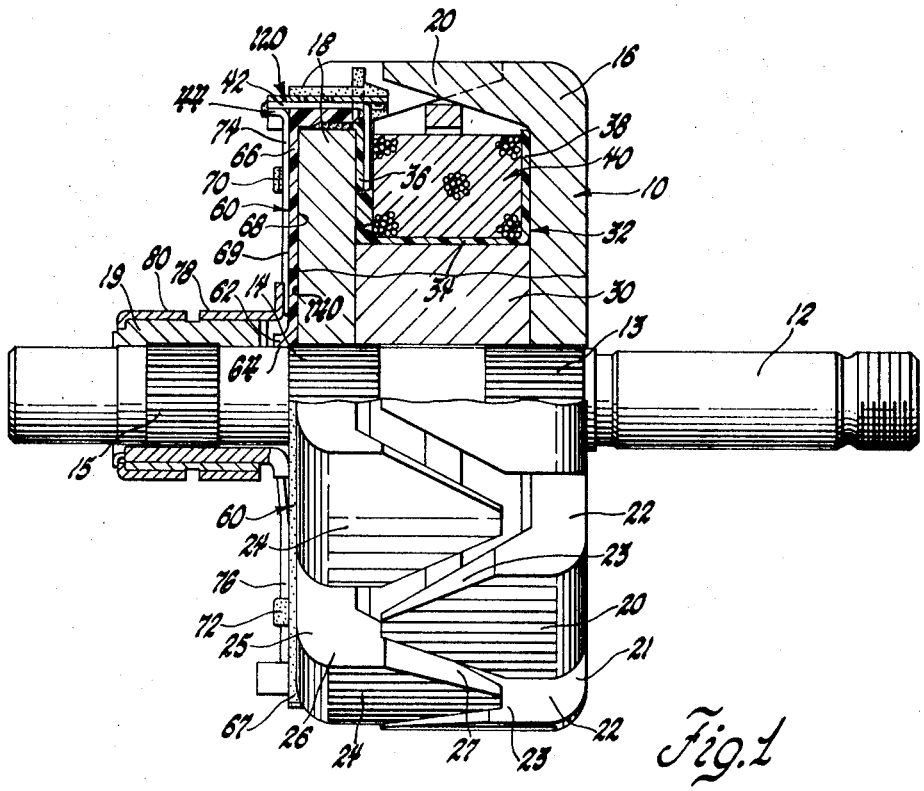
FIG. 1 shows an axial cross section partially broken away of a rotor for an alternator utilizing the spool and insulator of the present invention.

With reference now to the rotor assembly shown in FIG. 1, it may be seen that rotor 10 is comprised of a shaft 12 having serrations 13, 14 and 15 thereon to receive and secure respectively rotor segment 16, rotor segment 18, and slip ring assembly 19. Rotor segment 16 includes a plurality of axially extending pole tips 20 that define openings 22 comprised of radially extending portions 21 and axially extending portions 23. Similarly, rotor segment 18 includes pole tips 24 defining openings 26 and having radially extending portions 25 and axially extending portions 27.

Bounded by rotor segments 16 and 18 and also secured on shaft 12 by serrations 13 and 14 is a soft iron core 30 having serrations (not shown) on its outer diameter. Core 30 supports a nylon insulator spool 32 which, as may be seen in conjunction with FIG. 5, is comprised of disklike flanges 36 and 38 connected by a cylindrical center portion 34 having internal splines 35 thereon that upon assembly deform to center spool 32 on shaft 12. A field coil 40 comprised of a plurality of continuous windings having a starting end 42 and a terminating end 44 is wound on center portion 34.

On its outer periphery, flange 38 of spool 32 has two diametrically opposed ears 46 and 48 that have an axially extending tab 47 of contour fitting closely within opening 25 of similar contour. These ears surround apertures 50 and 51 and provide channels 52 and 53 extending outwardly therefrom, respectively. Moreover, commencing adjacent ear 46 and terminating tangential to the outer diameter of cylinder 34 is a partially enclosed or undercut groove 54 that continues as an unenclosed groove 55 to make a cord along the inner surface of side 58.

To properly position spool 32 in the winding apparatus (not shown) for the subsequent insertion of coil starting end 42 and coil winding, a drive pin (not shown) is advanced from the winding apparatus into hole 37 in flange 36. This pin is then rotated by the winding apparatus until flange 38 is in such a position that tang 39 extending radially and axially from the flange slides into a mating cavity (not shown) on the winding apparatus. Tang 39 is used to restrain spool 32 from rotating under the tension of the wire being wound and also to reject the spool from the winding apparatus upon the completion of winding. With the commencement of coil winding, grooves 54 and 55 cooperate to allow starting end 42 of coil 40 to be guided first through groove 55, then through groove 54, and finally out ear 46. After end 42 is hooked into hole 50 through slot 52, coil end 42 slips from groove 55 and is wound in cylinder 34 with a lead determined by spiral 56. As the various layers of coil 40 are wound between sides 36 and 38, lead 42 is protected from contacting the remaining turns of field coil 40 by groove 54.

Figure 2:
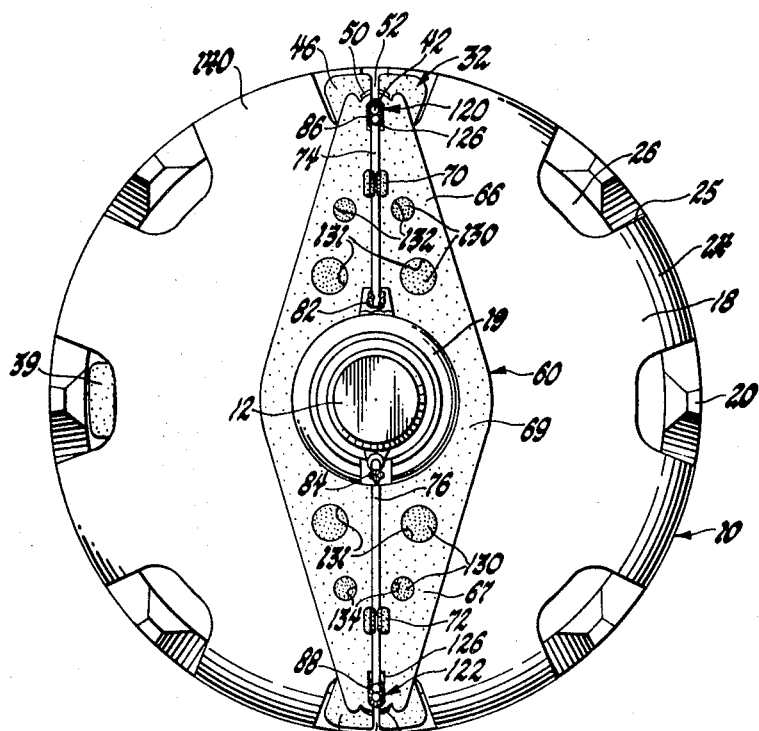
FIG. 2 is an end view of the rotor showing in plan view the insulator of the present invention and also a portion of the spool ears.

Insulator 60, as may be seen in conjunction with FIGS. 1, 2, and 3, has central hub 62 of inner diameter 64 that is mounted on shaft 12 so that surface 64 engages serrations 14. Defining a generally diamond or elliptical shape, insulator 60 has tongues 66 and 67 of inner and outer surfaces 68 and 69 extending radially from hub 62 and terminating in axially extending barrellike projections 90 and 92. Secured to surface 69 by snaps 70 and 72 extruded thereon are leads 74 and 76 respectively connected at one end to sections 78 and 80 of slip rings 19 by welds 82 and 84 and at the other end to coil ends 42 and 44 by welds 86 and 88.

As perhaps best shown in FIG. 5, projections 90 and 92 are each comprised of a barrel 94 connecting a tongue 76 or 78 to a nose region 96 having tapered sections 98 and 100. The projections are reinforced axially from the tongue by struts 102 and 104 and also by a hub 106 of contour similar to that of ear hub 47 and opening 25. To allow ends 42 and 44 to be brought out readily from spool 32 and to thereafter receive a conductive terminal 120 and 122, barrels 94 have central hemispherical bores 108 therethrough, best seen in FIGS. 3 and 4. This bore extends from the tip of nose 96 through the outer surface 69 of tongues 76 and 78. Moreover, to allow the ready insertion of wire 42 into bore 108 and aperture 50 in ear 46, a channel or slot 110 is provided along barrel 94 to communicate with bore 108. Tapered sections 98 and 100 of nose 96 not only cooperate with channel 110 to contract upon their insertion into a hole 50 or 51 in ear 46 or 48, but also terminate along barrel 94 in an arcuate ledge 114 that after insertion locks the ears axially, radially, and snugly onto barrel 94.

Terminals 120 and 122 each having an axial sheath section 124 and a radial tab section 126 are inserted into bores 108 of barrels 94. Sheath section 124 blocks channel 110 communicating with bore 108 so that wire 42 and 44 may first be inserted into channel 110 and then be restrained from being ejected therefrom by centrifugal action. Tab section 126 may be crimped around and welded to coil end 42 and lead 74 or coil end 44 and lead 76.

After assembly, insulator 60, rotor segments 16 and 18, and spool 32 are coated with a varnish compound 130 that flows through openings 128 in terminal sheath 124 to assure that ends 42 and 44 are firmly supported in bore 108. To also assure that insulator 60 adheres to the outer surface 140 of rotor element 18, varnish coating 130 is also applied through holes 131 and 132 to grooves 134 communicating therewith on the inside surface 68 of insulator 60 between rotor surface 140 and insulator surface 68 abutting thereagainst. Such adhesion provisions prevent flutter of insulator 60 with respect to element 18 thereby preventing fatiguing of the insulator and the conductors it carries as well as preventing objectionable noise.

It will be obvious to those skilled in the art that modifications and changes can be made without departing from our invention. For example terminals 120 and 122 could be eliminated by arranging slots 110 to communicate tangentially with bores 108 instead of radially and by welding coil end 44 to lead 76 at other regions on insulator 60 including for instance the regions of snap 70 and 72.

We therefore aim in the appended claims to cover such modifications and changes which fall within the true spirit and scope of our invention. What we claim as new and desire to secure by letters of patent of the United States is:

1. In a rotor for dynamoelectrical apparatus
   a. a shaft
   b. a rotor segment mounted on said shaft and having a wall defining first and second surfaces extending radially and terminated by a plurality of pole tips, said pole tips have radially extending portions defining openings therebetween;
   c. a spool member mounted concentrically with said rotor element and having a center region bounded at one end by a disk-shaped flange located adjacent said first surface of said rotor wall and having a periphery and an ear with an aperture therethrough, said ear extending radially from the periphery of said flange to one of said openings between said pole tips;
   d. an insulator member having a hub region mounted concentrically with said rotor segment and having a tongue located adjacent said second surface of said rotor wall and extending radially from said hub region to said one of said openings between said pole tips, said insulator having a projection with an aperture therethrough and extending through said opening and into said aperture of said spool ear, whereby said projection restrains said ear radially and axially and whereby said spool and said insulator mutually position each other adjacent said first and second rotor wall surfaces;
   e. a slip ring mounted concentrically with said insulator and a coil wound on said spool; and
   f. a conductor connecting said slip ring and with said coil through said opening and through said apertures in said projection and said ear.

2. In a rotor for dynamoelectrical apparatus
   a. a shaft
   b. a rotor segment mounted on said shaft and having a wall defining first and second surfaces extending radially and terminated by a plurality of pole tips, said pole tips have radially extending portions defining openings therebetween;
   c. a spool member mounted concentrically with said rotor segment and having a center region bounded at one end by a disk-shaped flange located adjacent said first surface of said rotor wall and having a periphery and an ear with an aperture therethrough, said ear extending radially from the periphery of said flange to one of said openings and secured radially in one of said openings;
   d. an insulator member having a hub region mounted concentrically with said rotor segment and having a tongue located adjacent said second surface of said rotor wall and extending radially from said hub region to said one of said openings between said pole tips, said insulator having a projection with an aperture therethrough and extending through said opening and into said aperture of said spool ear, whereby said projection restrains said ear radially and axially and whereby said spool and said insulator mutually engage each other against said first and second rotor wall surfaces;
   e. a slip ring mounted concentrically with said insulator and having a lead supported by the insulator;
   f. a coil wound on said spool and having starting and terminating ends; and
   g. a terminal supported in said aperture of said projection and conductively connected with a lead from said slip ring and one end of said coil.

3. In a rotor for dynamoelectrical apparatus
   a. a shaft
   b. a rotor segment mounted on said shaft and having a wall defining first and second surfaces extending radially and terminated by a plurality of pole tips, said pole tips have radially extending portions defining openings therebetween;
   c. a spool member mounted concentrically with said rotor segment and having a center region bounded by a disk-shaped flange located adjacent said first surface of said rotor wall, said flange having a periphery and an ear with an aperture therethrough, said ear extending radially from the periphery of said flange to one of said openings;
   d. an insulator member having a hub region mounted concentrically with said rotor segment and having a tongue located adjacent said second surface of said rotor wall and extending radially from said hub region to said one of said openings between said pole tips, said insulator having an axially extending projection secured in said opening and said tongue having an orifice and a groove communicating therewith, and adjacent said second rotor surface said groove filled with material adhering to said insulator and said surface, whereby said insulator adheres to said surface.
   e. a slip ring mounted concentrically with said insulator and a coil wound on said spool; and
   f. a conductor connecting said slip ring and with said coil through said opening and through said apertures in said projection and said ear.